Figure 1:
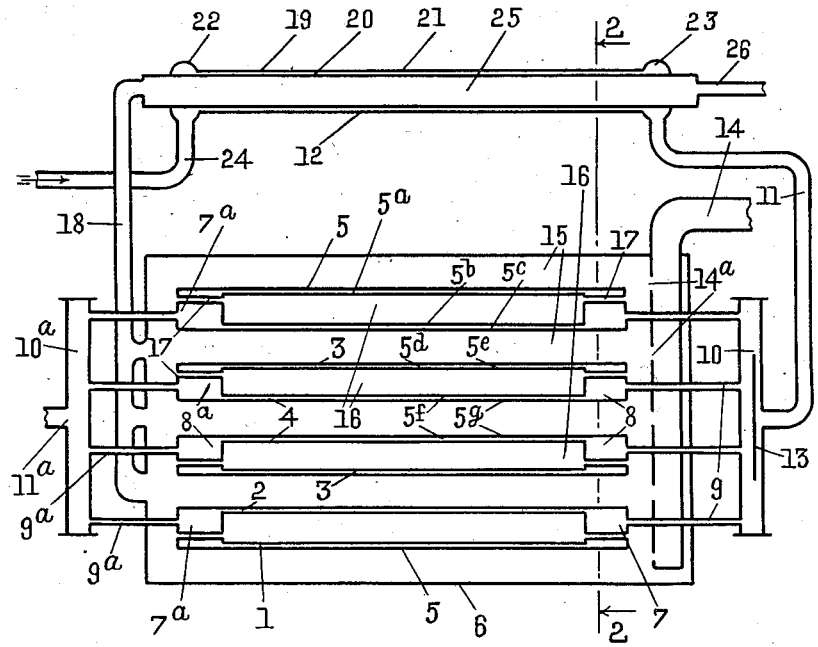

March 24, 1936.  H. DREYFUS  2,034,714

PROCESS FOR THE MANUFACTURE OF LOWER ALIPHATIC ANHYDRIDE

Filed Aug. 22, 1932

INVENTOR
HENRY DREYFUS
BY
J Seltzer and Leo Lennon
ATTORNEYS

Patented Mar. 24, 1936

2,034,714

UNITED STATES PATENT OFFICE 2,034,714

PROCESS FOR THE MANUFACTURE OF LOWER ALIPHATIC ANHYDRIDE

Henry Dreyfus, London, England

Application August 22, 1932, Serial No. 629,911
In Great Britain September 30, 1931

8 Claims. (Cl. 260—123)

This invention relates to the manufacture of aliphatic anhydrides by the thermal decomposition of aliphatic acids, and especially to the manufacture of acetic anhydride by the thermal decomposition of acetic acid.

Industrially this process is carried out by passing the acid vapour in a stream through heated tubular or like reaction zones usually containing catalysts or through molten bodies of catalysts, and the vapours are usually preheated by passing them through tubular or like preheaters prior to admitting them to the reaction zone.

In practice it is a matter of great difficulty to attain anything like uniform heating of the vapours in the preheaters or in the reaction zones, a matter that has great disadvantages. Thus, lack of uniform heating in the preheaters involves not only failure to preheat a considerable proportion of the vapours to the proper temperature, but often also excessive premature formation of anhydride that is liable to become destroyed in the subsequent passage through the reaction zone. Whilst the lack of uniform heating is particularly disadvantageous in the preheaters, it is also disadvantageous in the reaction zone as it gives rise to poor yields and in many cases destruction through local overheating. If very narrow tubes are employed as preheaters or reaction zones to obtain uniform heating, a very large number have to be employed to obtain any considerable rate of production, and the plant becomes too complicated and expensive in prime cost and upkeep to be economical.

I have found that these difficulties may be largely or entirely overcome by heating the acid vapour, and particularly by preheating the acid vapour prior to the entry thereof into the reaction vessel, by causing the acid vapours to pass between heated walls spaced near to each other, and especially less than ½ inch and preferably about ¼ to 1/20 inch apart. The walls may be straight or curved, or may be cylindrical or of other closed form, thus causing the vapours to pass for instance in the form of a thin sheet, annulus or the like. Conveniently, the apparatus employed may take the form of two or more concentric pipes or the like placed within one another and arranged so as to form a thin annular space, for instance a space of about ¼ inch to 1/20 inch between the two pipes, when only two are employed, and a series of such annular spaces alternating with other spaces that may be wider, for example 1–6 inches, when a number of tubes are employed. Preferably the pipes are large or relatively large in diameter, for instance from 6 inches to 3 feet or more. Obviously, pipes or the like of square or other section may be employed in place of circular pipes.

The apparatus may, of course, be heated in any convenient way, as for instance by firing or by hot furnace or other gases or superheated steam, or electrically. Heating is preferably applied to both of the walls of each narrow space; for instance when two concentric pipes are employed, the heating medium may be caused to pass through the inner pipe as well as around the outer pipe, and when a number of tubes are used, the heating medium may be caused to pass through each of the alternate and wider spaces. When a heating medium is employed, the same may pass in heat exchanging relationship with the vapours through or over the apparatus in any direction relatively to the direction of the vapours undergoing treatment.

The method of heating of the invention may be applied to preheating of the acid vapour, or to the decomposition of the same into anhydride or to both such operations. Moreover, in cases where it is applied to the decomposition, the acid vapour may be preheated by any method or preheating may be omitted. Preferably, however, the acid vapours are preheated by the method of the invention, and in such cases the subsequent thermal decomposition may be effected in any convenient way. Preferably, in order to ensure uniform decomposition to anhydride, the preheated vapours are subjected to decomposition, in presence or absence of catalysts, by the heating method of the invention or by passing the preheated vapours through a body of molten material, especially molten catalysts or molten masses containing catalysts.

The preheating, where such is performed, may be to any convenient temperature, temperatures below and approaching those employed in the decomposition reaction being especially useful. Usually temperatures of up to about 350° to 450° C. are very suitable. The decomposition may be performed at temperatures of for instance between about 400° to 850° C., and especially about 500° to 650° C.

Figure 2:
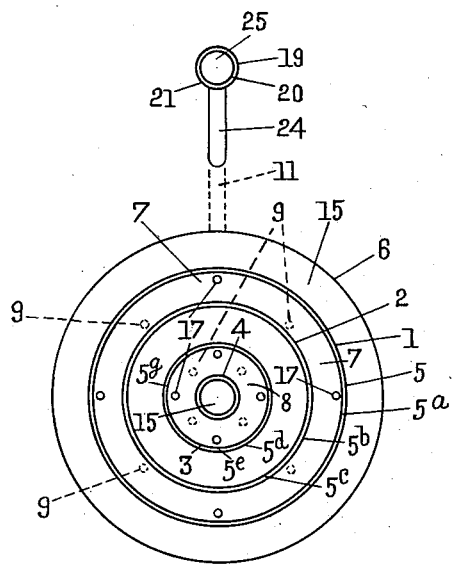

A convenient form of apparatus that may be used in putting the invention into practice is shown diagrammatically in the drawing, in which Figure 1 represents a longitudinal section through the apparatus and Figure 2 a transverse sectional view on the line 2—2 in Figure 1.

The apparatus consists of four narrow annular spaces 1, 2, 3, 4 bounded by the concentric tubes 5, 5a, 5b, 5c, 5d, 5e, 5f, 5g, the whole being enclosed in a cylindrical casing 6. The adjacent pairs of annular spaces 1 and 2, and 3 and 4 are joined together by the annular chambers 7 and 8 respectively at the inlet end and 7a and 8a respectively at the outlet end. The chambers 7, 8 are connected by tubes 9 with the manifold 10 into which hot acid vapour is led by the pipe 11 from the preheater 12. The manifold 10 contains a baffle plate 13 in order to obtain as uniform a distribution as possible of the acid vapours throughout the annular spaces. The chambers 7a, 8a, are connected by pipes 9a to the manifold 10a from which the vapours are led by the pipe 11a, to the separation plant.

The heating gases are introduced into the apparatus by the pipe 14, and the perforations 14a, and are caused to pass between and around the pairs of annular spaces by the heating spaces 15 and by the spaces 16 communicating with the rest of the heating space by the pipes 17 which traverse the chambers 7, 8, 7a, 8a. On leaving the apparatus the hot gases are led by the pipe 18 to the preheater 12.

The preheater consists simply of a pair of concentric tubes 19 and 20 enclosing the narrow annular space 21 which is expanded at either end to the circular chambers 22 and 23. The chamber 22 communicates with the inlet tube 24 for the acid, while the chamber 23 communicates by the pipe 11 with the inlet manifold 10 leading to the decomposition zone. The hot gases are led by the pipe 18 to the space 25 enclosed within the annular space 21 of the preheater 12, and thence to the outlet 26. The outer wall 19 of the preheater 12, as also the pipes 11 and 18 are preferably lagged or otherwise heat insulated.

The mode of operation of the apparatus is as follows. Acetic (or other aliphatic) acid vapour is caused to enter the preheater by the inlet pipe 24, and passes through the annular chamber 22 to the narrow annular space 21 of the preheater; from the preheater it is led by the heat insulated pipe 11 to the manifold 10 and thence by the pipes 9 through the annular chamber 23 and the annular chambers 7, 8 to the annular spaces 1, 2, 3, 4, of the decomposition chamber. Here it is brought into contact with a suitable catalyst, such as for example calcium tungstate, and scission into water vapour and anhydride vapour takes place. The vapours pass through the annular chambers 7a, 8a and the pipes 9a to the outlet manifold 10a; they then pass to the outlet 11a and are then preferably subjected to a process whereby the water is separated from the anhydride while still in vapour form.

The narrow annular spaces 1, 2, 3, 4, in the decomposition chamber and 21 in the preheater may conveniently be heated by the passage of hot gases through the wider spaces 15, 16 and 25 respectively, although of course any other method of heating may be employed. These hot gases may be introduced through the pipe 14 through the perforations 14a to the heating space 15 and (passing through the pipes 17 in the chambers 7, 8, 7a, 8a) the spaces 16. The partially cooled gases may then be led by the pipe 18 to the space 25 of the preheater, where they serve to heat the acetic or other acid vapours before they are passed to the decomposition zone. Any heat remaining in the gases may be employed, for example, to assist the preliminary vaporization of the acid.

Although in the apparatus illustrated the decomposition is effected in a number of concentric annular spaces, a number of annular spaces formed by pairs of concentric tubes, but which are not themselves concentric, may be employed. Examples of apparatus of this form are illustrated in my co-pending U. S. applications S. Nos. 629,910 filed August 22, 1932, and 629,912 filed August 22, 1932.

The temperature of the hot gases may conveniently be so regulated that the decomposition chamber is heated to about 500°–650° C., and the preheater to about 350°–450° C.

After leaving the decomposition zone, the water vapour and anhydride may be separated in any convenient way, preferably while the former at least is still in the vapour phase. For instance, the anhydride may be separated by fractional condensation as described, for example, in my U. S. Patent No. 1,735,957. Or the anhydride may be condensed while the water vapour is removed by means of the vapour of an entraining liquid, such as benzene, carbon tetrachloride, petroleum ether, etc., as described in my U. S. application S. No. 284,566, filed June 11, 1928. Again, the anhydride may be removed by means of a liquid in which it is soluble, but water is insoluble, as described in my U. S. application S. No. 285,613, filed June 15, 1928. Examples of liquids that may be used in this process are benzene, chloroform, petrol, etc. In a modification of this process, disclosed in my U. S. application S. No. 330,577 filed January 5, 1929, the vapours from the reaction zone are caused to impinge on the surface of a stream of such liquid. Another method that may be employed, described in my U. S. Patent No. 1,817,614, consists in passing the reaction vapours over water binding substances such as bisulphates, pyrosulphates, zinc or calcium chloride or a phosphoric acid, preferably at temperatures high enough to prevent condensation of the anhydride. Any other method of separation may, however, be employed.

What I claim and desire to secure by Letters Patent is:—

1. Process for the manufacture of acetic anhydride by thermal decomposition of acetic acid, which comprises decomposing the acetic acid in the form of thin annular sheets at a temperature between 400° and 850° C.

2. Process for the manufacture of acetic anhydride by thermal decomposition of acetic acid, which comprises decomposing the acetic acid in the form of thin annular sheets at a temperature between 400° and 850° C. in presence of a catalyst.

3. Process for the manufacture of acetic anhydride by thermal decomposition of acetic acid, which comprises preheating the acetic acid in the form of thin annular sheets to a temperature between 350° and 450° C. and subsequently decomposing the acetic acid in the form of thin annular sheets at a temperature between 400° and 850° C. in presence of a catalyst.

4. Process for the manufacture of acetic anhydride by thermal decomposition of acetic acid, which comprises thermally decomposing the acetic acid by heating the same in the form of thin annular sheets to decomposing temperatures.

5. Process for the manufacture of acetic anhydride, which comprises preheating acetic acid vapor in the form of thin annular sheets and subsequently producing acetic anhydride by decomposing the acetic acid vapor in the form of thin annular sheets at a temperature between 400° and 850° C. in presence of a catalyst, the acetic acid vapor being raised to a temperature between 350° C. and the thermal decomposition temperature during the preheating.

6. Process for the manufacture of lower aliphatic anhydride by thermal decomposition of lower aliphatic acid, which comprises decomposing the lower aliphatic acid in the form of thin annular sheets at a temperature between 400° and 850° C.

7. Process for the manufacture of lower aliphatic anhydride by thermal decomposition of lower aliphatic acid, which comprises decomposing the lower aliphatic acid in the form of thin annular sheets at a temperature between 400° and 850° C. in presence of a catalyst.

8. Process for the manufacture of lower aliphatic anhydride by thermal decomposition of lower aliphatic acid, which comprises preheating the lower aliphatic acid in the form of thin annular sheets to a temperature between 350° and 450° C. and subsequently decomposing the lower aliphatic acid in the form of thin annular sheets at a temperature between 400° and 850° C. in presence of a catalyst.

HENRY DREYFUS.